United States Patent [19]

Douglas

[11] 4,064,518
[45] Dec. 20, 1977

[54] COMPACT SELF-DEVELOPING CAMERA WITH FOLDED OPTICAL IMAGE PATH

[75] Inventor: Lawrence M. Douglas, South Easton, Mass.

[73] Assignee: Polaroid Corporation, Cambridge, Mass.

[21] Appl. No.: 720,054

[22] Filed: Sept. 2, 1976

[51] Int. Cl.² .................... G03B 17/50; G03B 15/00
[52] U.S. Cl. ................................. 354/86; 354/150
[58] Field of Search ............................... 354/83–86, 354/150

[56] References Cited

U.S. PATENT DOCUMENTS

| | | | |
|---|---|---|---|
| 3,800,309 | 3/1974 | Land | 354/219 X |
| 3,818,498 | 6/1974 | Zehnpfennig | 354/150 |
| 3,967,304 | 6/1976 | Johnson et al. | 354/83 |

FOREIGN PATENT DOCUMENTS

| | | | |
|---|---|---|---|
| 1,210,854 | 11/1970 | United Kingdom | 354/86 |

Primary Examiner—John Gonzales
Attorney, Agent, or Firm—David R. Thornton

[57] ABSTRACT

A camera of the self-developing type has a compact arrangement in which the optical image path between the taking lens and the image surface is folded, and an exposed film unit is advanced along a path which crosses this optical path. After crossing the optical path and arriving at a location spaced away from the image surface, the film unit engages the spread rollers that initiate film processing.

17 Claims, 4 Drawing Figures

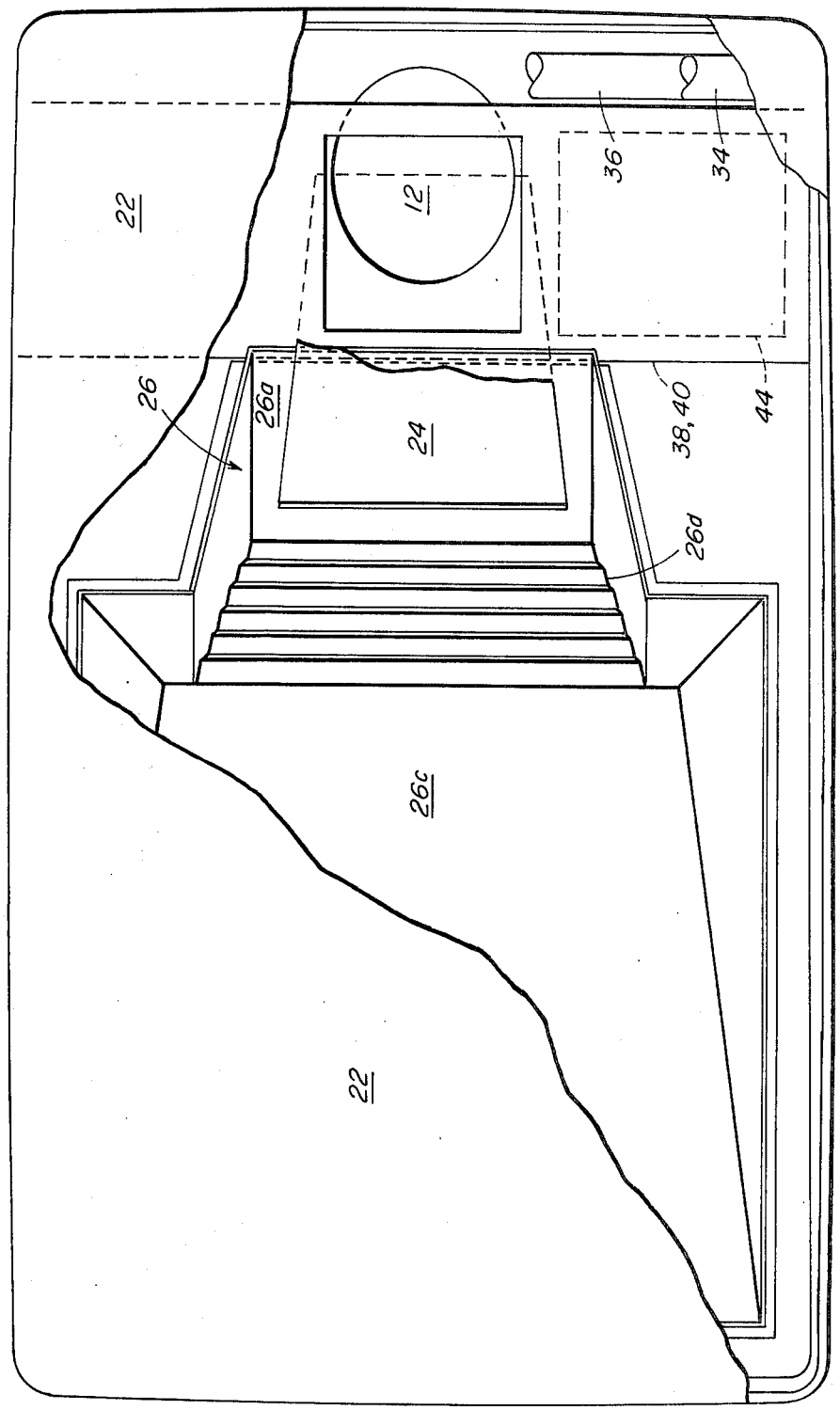

COMPACT SELF-DEVELOPING CAMERA WITH FOLDED OPTICAL IMAGE PATH

BACKGROUND

This invention relates to a compact arrangement of elements in photographic apparatus, and in particular concerns a compact camera of the self-developing type.

In a preferred embodiment, the invention provides such a camera that has a folded optical image path and in which a surface that both reflects and transmits the image rays is free of interference from other camera elements in an optimum geometry where that surface is closely spaced above and extends laterally beyond the image surface of film exposure.

Cameras of the self-developing type are known in which an exposed film unit is processed within the camera to produce a visible image of the object focused at the image surface. The camera feeds the exposed film unit through the nip between a pair of spread rollers. The rollers spread a photoprocessing composition packaged with the film unit across the photosensitive layers to initiate formation of the visible image. Depending on the type of film, the treated film unit is maintained under light-tight conditions for a period of time sufficient for the visible image to form, or the film unit can be advanced into the ambient light substantially immediately after spreading of the processing composition. Self-developing cameras of this type are disclosed for example in U.S. Pat. Nos. 2,873,658; 3,396,647; and 3,537,370; and U.S. Pat. No. 3,415,644 discloses a film unit of the latter type, i.e. which can be transferred into ambient light directly after spreading of the processing composition.

The "picture" produced in a self-developing camera is, at least in most instances, the final photograph and hence should be sufficiently large for direct viewing. This is in contrast to a camera which records an image that is enlarged — by enlargement on a print or by projection — prior to viewing. To produce a satisfactorily large image at the image surface, i.e. the film plane or other surface in the camera where the film is exposed, the camera requires a relatively long optical path between the taking lens and the image surface. It is for this reason that many self-developing cameras, as well as other cameras which produce large images, are relatively bulky. This is especially true for such cameras which have rigid bodies, and accordingly many have collapsible bodies, typically incorporating folding bellows. It is also known to reduce the overall size of these cameras by folding the optical system by using mirrors or other reflectors.

The compactness of a self-developing camera having a folded optical system can be enhanced by having one reflective, "path-folding" surface overlie the image surface. As U.S. Pat. No. 3,818,498 of Zehnpfennig discloses, this can be achieved with a mechanical collimator that is reflective to rays impinging on it at certain angles, but transmissive for rays incident on it at another selected angle. The commonly-assigned patent application of Bruce K. Johnson entitled "Compact Prism Camera", Ser. No. 720,004 and filed on even date herewith, discloses an improvement in which an optical prism is used in lieu of the collimator. The prism faces provide the reflective and transmissive surfaces for folding the optical path of the camera. Regardless of what means are used, to attain maximum compactness, the reflective/transmissive surface is located close to the image surface, preferably with only a narrow clearance space between them.

Further, as the above-noted Johnson application discloses, a preferred geometry of the folded optical path calls for the dual-acting surface to extend laterally beyond the camera image surface. However, this extension of the prism, or of whatever other means provides the film-overlying surface of both reflection and transmission, beyond the image surface interferes with the conventional placement of the spread rollers. They generally are placed right next to the image surface, so that an exposed film unit advances to them with only short travel. This conventional roller placement is considered to minimize the likelihood that an exposed but unprocessed film unit will be subjected to unwanted exposure.

Thus, the attainment of an optimally-folded optical path for a highly compact self-developing camera is complicated by other factors, including the location of the spread rollers. Another factor is that the film units are preferably maintained flat in the camera, i.e. during storage, exposure, advance, and processing.

Accordingly, it is an object of this invention to provide a self-developing camera having an improved compact folded optical image path. It is also an object that the camera provide such an optical path within a rigid but compact camera body. A further object is that the camera employ a prism in the optical path and overlying the image surface.

Another object of the invention is to provide a compact arrangement for a camera of the self-developing type employing a prism for folding the optical image path and having minimal restraint on the shape and placement of the prism. It is a particular object to provide such a camera which allows space for the prism to have a geometrical configuration which can be essentially optimized with regard to folding the optical path and restricting spurious rays. Another object is that the camera arrangement facilitates locating the prism relative to the film surface for overall compactness.

It is also an object of the invention to provide a camera having the foregoing features and in which each film unit is flat while in the camera. The attainment of this object not only enhances the film exposure and processing, it also facilitates advancing the film through the camera with minimal drag and likelihood of jamming.

Other objects of the invention will in part be obvious and will in part appear hereinafter.

BRIEF DESCRIPTION OF INVENTION

A camera arrangement according to the invention solves the foregoing problems and attains the foregoing and other objects by advancing an exposed film unit along a path which traverses a folded optical path. Further, the camera has the spread rollers removed to a location beyond the optical path. The point where the film path crosses the optical path is arranged to be behind the shutter of the camera. Hence, the shutter automatically prevents unwanted film exposure by light from the image path. The camera provides this operation with separate (i.e. unconnected) card-like self-developing film units which are commercially available. The camera advances each film unit separately, i.e. without advancing others stored therein.

The camera thus accommodates the desired folded optical image path, and the desired configuration and location of the path-forming optical elements, by allowing each exposed film unit to advance across the optical path prior to processing. This is coupled with the removal of the spread rollers, which are so critical for processing of the exposed film unit, from their conventional location closely adjacent the film unit being exposed to a relatively remote location in the camera.

A prism camera incorporating the foregoing features of the invention arranges an optical prism with one face directly overlying and closely spaced from the image surface. Further, this same prism face extends laterally beyond the film unit being exposed, as desired for a preferred compact folding of the optical path. After exposure through the prism, the exposed film unit is advanced alongside the extending portion of the prism, and across the optical path which feeds into the prism, to the remotely-located spread rollers. The camera provides a planar image surface and incorporates the entire path of film advance in this plane. Consequently, a film unit is in the desired flat configuration continually during exposure, subsequent advance, and processing through the spread rollers. This planar geometry of the film unit enhances both high quality exposure and processing, and facilitates easy advance of the film unit with minimal frictional drag and miminal likelihood of jamming.

The invention accordingly comprises the features of construction, combinations of elements, and arrangement of parts exemplified in the constructions hereinafter set forth, and the scope of the invention is indicated in the claims.

For a fuller understanding of the nature and objects of the invention, reference should be had to the following detailed description taken in connection with the accompanying drawings, in which:

FIG. 3 is a top plan view, partly broken away, of the camera shown in FIG. 2.

DESCRIPTION OF ILLUSTRATED EMBODIMENT

Figure 1:
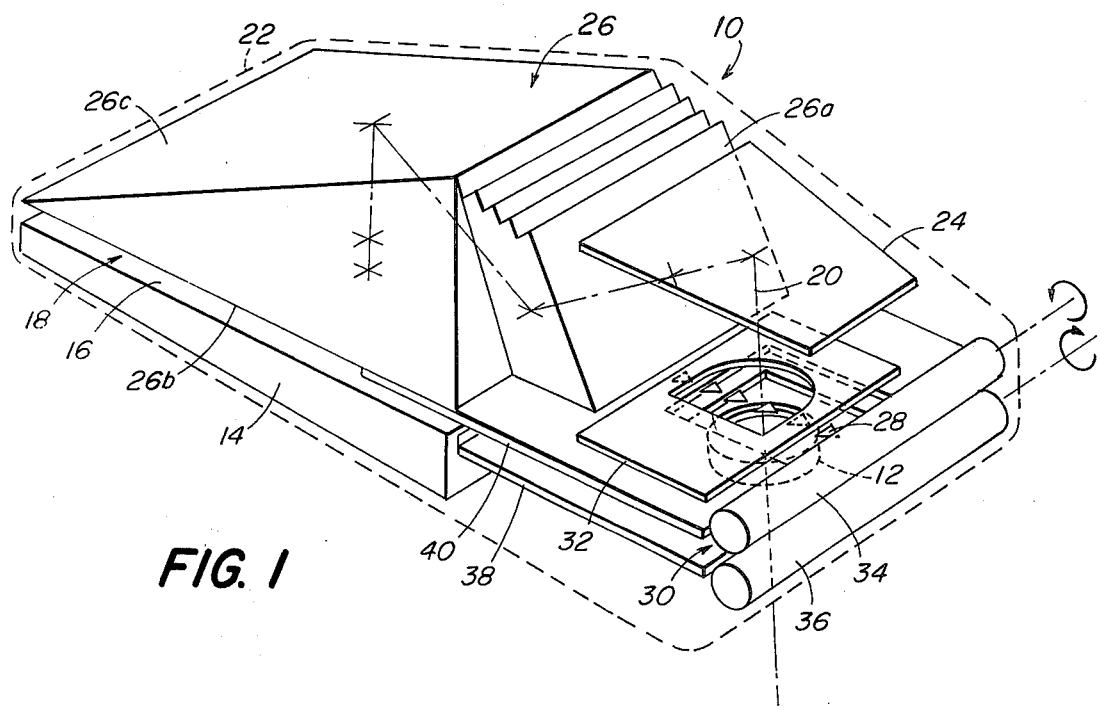
FIG. 1 is a simplified schematic showing of a prism camera embodying the invention.

A prism camera 10 shown in FIG. 1 and embodying the invention has a taking lens 12 and a chamber which houses a cassette 14 of self-developing film units. The uppermost film unit 16 in the cassette is presented for exposure from above at a planar image surface 18. The camera has a folded optical image path 20 which extends between the taking lens and the image surface for exposing this film unit. The optical path is depicted by the principal light ray from the object which, by definition, enters the lens 12 along its axis. A camera housing 22 which is light tight as conventional except at selected openings contains the elements of the camera.

From the lens 12, the optical path 20 successively engages a reflector 24, the entry face 26a of a prism 26, and a prism face 26b which in large part overlies the image surface 18. The path is folded here to engage a third prism face 26c, which redirects the image rays to pass through the second face 26b to expose the film unit at the image surface.

After exposure by light which traverses the foregoing folded optical path 20, the film unit 16 is advanced along a film path 28 that extends from the cassette 14 and across the optical path to a processing location 30.

The section of the optical path which the film path 28 crosses is the branch between the taking lens 12 and the reflector 24. The shutter 32 of the camera 10 is interposed in the optical path behind the lens 12 and ahead of the film path 28. It thus closes the optical path at the time when the exposed film unit is advanced across it along the film path 28. It is common for the film unit to have an opaque sheet as the bottommost layer, and this also blocks unwanted light from the photosensitive upper layers.

A pair of spread rollers 34 and 36, conventional for a self-developing camera but traditionally adjacent the film pack as disclosed for example in U.S. Pat. No. 3,810,211, are located at the processing location of the camera 10. The rollers are arranged for rotation in opposite directions, as indicated, for drawing the exposed film unit from the processing location into the nip which the rollers define. As is conventional and known, the engagement of the spread rollers with the film unit discharges a photoprocessing composition packaged along the leading marginal edge of the film unit and spreads it across the photosensitive portion. Interaction of the composition with the photosensitive material initiates the production of a visible image on the film unit.

Noteworthy in the camera 10 is that the film path 28 crosses the folded optical path, and that the spread rollers, to which the film path leads, are spaced relatively far away from the cassette 14 and engage the film unit only after it has advanced across the optical path. As indicated above, this novel arrangement of a self-developing camera enables it to employ a folded optical path of highly compact and optically-efficient geometry. The invention thus provides a camera 10 which produces prints as large as those of presently-available self-developing cameras but with a rigid, i.e. non-folding, camera body of significantly smaller size than those available in the prior art.

A camera embodying the invention has, of course, other conventional camera elements which, for clarity, are not shown. One such element is the viewfinder. It can be of a conventional construction or can be of a preferred form as disclosed in the commonly-assigned application Ser. No. 720,047, of L. M. Douglas filed on even date herewith for "Selective Closure Of Camera Viewfinder And Camera Incorporating Same".

Figure 2:
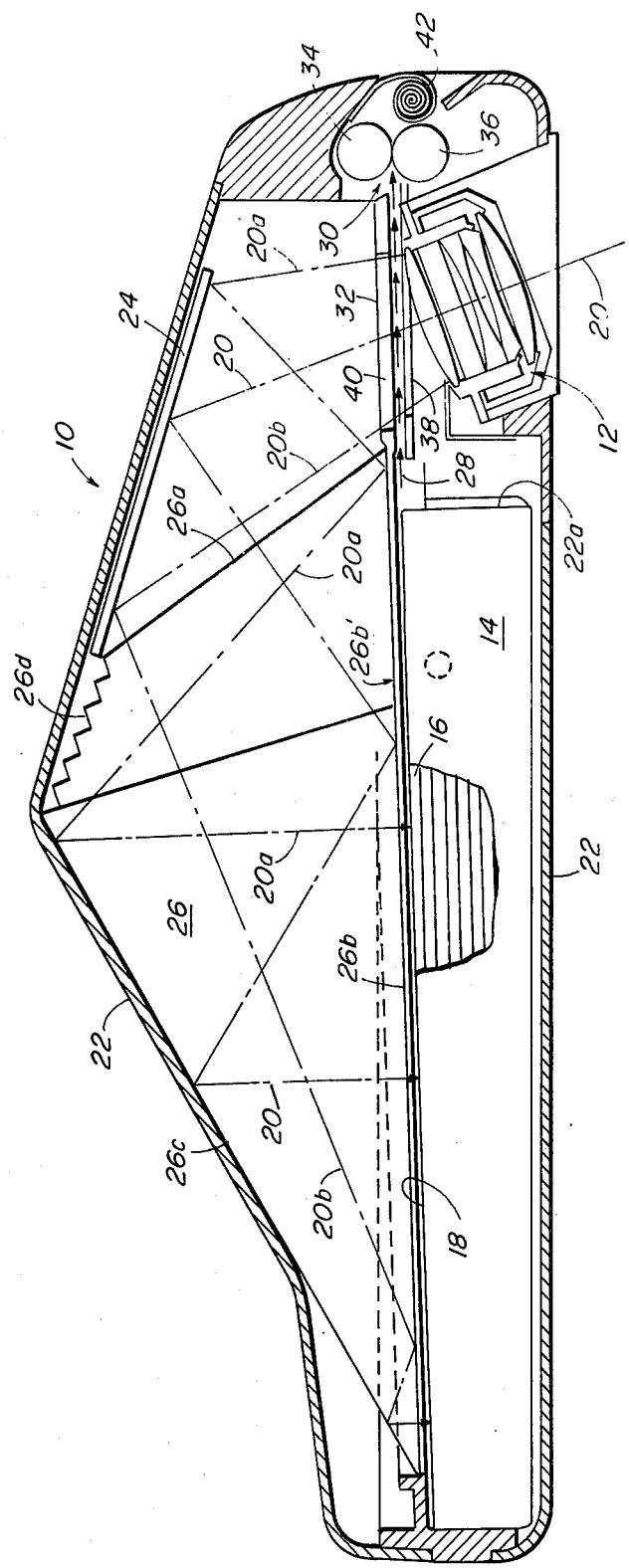
FIG. 2 is a transverse side elevation view of a camera according to FIG. 1.

FIGS. 2 and 3 show in further detail a preferred embodiment of the camera 10. Elements of the camera bear the same reference numerals in FIGS. 2 and 3 as the corresponding elements in FIG. 1. Further, extreme rays 20a and 20b depict with broken lines the edges of the optical image path 20 through the camera.

The camera illustrated in FIGS. 2 and 3 uses a film cassette 14 of the type presently available, for example, for the self-developing camera marketed by the Polaroid Corporation under the registered designation SX-70. Each film unit in the cassette has a planar card-like configuration with a large border at the front (right side of FIG. 2) where the photoprocessing composition is packaged. The camera housing 22 forms a compartment 22a for receiving and holding the film cassette 14 and provision is made for replacing a spent cassette with a fresh one. The image surface 18 lies in a plane coincident with the upper surface of the topmost film unit 16.

The camera taking lens 12 has a multi-element construction and is located below the plane of the image surface 18, i.e. on the same side of this plane as the major portion of the film cassette 14 and the film units stored therein.

The film path 28 lies along the plane of the image surface, as does the nip between the spread rollers 34, 36. This planar construction allows an exposed film unit to be flat throughout storage and during the exposure, film advance, and processing operations. This is desired to facilitate attaining high quality projection of the image on the film plane, and high quality recording of that image on the film unit. The planar construction also facilitates advancing the film unit within the camera because there is minimal frictional drag and minimal likelihood of jamming. The camera construction shown in FIGS. 2 and 3 thus can employ a film advance mechanism (not shown) of relatively simple construction. The commonly assigned patent application Ser. No. 720,007, of L. M. Douglas filed on even date herewith for "Film Advance Mechanisms" discloses suitable mechanisms for this advance of a film unit.

With further reference to FIGS. 2 and 3, a pair of plate-like film guide members 38, 40 extend along the film path 28 in the span thereof between the film cassette 14 and the processing location 30. The guide member 38 is located below the plane of the image surface, and the guide member 40 is parallel to it and spaced above this plane. The lower member is formed as a support plate located closely above the taking lens 12 and apertured to pass all wanted light rays which enter the lens. The upper guide member 40 is a similarly apertured plate which, in addition, mounts the camera shutter 32. The shutter preferably is of the known type which employs two apertured plate-like blades, a first of which moves to open the shutter and the second of which is then moved, suitably under electronic control, for closing the shutter. The spread rollers 34 and 36 are mounted in the camera 10 closely adjacent the housing front wall for counter rotation about parallel axes to provide a film-pressing nip which lies in the plane of the image surface. Hence, advancement of a film unit along the path 28, to the processing location 30, introduces the leading margin of the unit into the roller nip. By way of example, the rollers can be driven by a motor coupled with a gear train and packaged adjacent the taking lens in the space 44 indicated in FIG. 3. After passing between the spread rollers, the film unit engages a film catcher and opaque shade 42 as it exists from the camera. U.S. Pat. Nos. 3,938,167 and 3,940,774 describe the construction and operation of this element.

With further reference to the illustrated camera construction in FIGS. 2 and 3, the reflector 24 is a front surface mirror secured to the roof of the camera housing 22. The portions of the optical path between the lens 12 and the reflector 24, and from there to the entry face of the prism 26, are in air.

The prism 26 has an entry face 26a angled facing the reflector 24 substantially transverse to rays of the optical path which reflect from it. The prism face 26b which overlies the film cassette 14 extends over the full area of the image surface 18, which is coextensive with the full photographic area of the film unit 16. The prism face 26b has a further portion 26b' which extends in the forward direction over the bottom margin of the uppermost film unit and beyond the front edge of the film cassette 14, as shown. At least part of this portion 26b' is silvered or otherwise provided with a front surface reflector; this reflective coating can extend over the full expanse of the portion 26b' but does not extend over the image surface.

The remaining edges of the prism 26 as shown in FIG. 2 are the optically-reflective surface 26c provided by silvering or otherwise coating the prism face, and a light-trapping portion 26d structured and coated to minimize the further propagation in the prism of rays which impinge on it, for they are spurious and unwanted.

With this construction of the prism 26, image rays which the reflector 24 directs into the prism at entry face 26a impinge on the prism face 26b, including the extended portion 26b', from where they are redirected upward to the prism face 26c. This reflective surface folds the rays straight downward so that all are parallel to each other, and perpendicular to the prism face 26b and correspondingly to the image surface 18. The rays hence exit from the prism by transmission through the face 26b and expose the film unit 16. The reflection of rays from that portion of the prism face 26b which overlies the image surface is by total internal reflection within the prism. However, some rays along the optical path strike the portion 26b' at an angle steeper than the critical angle. Hence they are at best only partly reflected by internal reflection. However, the reflective coating applied to this surface portion reflects essentially all of these rays which are steeply incident on the face 26b.

Further description of the camera 10 is set forth in the above-noted commonly-assigned applications of L. M. Douglas, and in the following commonly-assigned application Ser. No. 720,006, filed on even date herewith: "Camera With Movable Film Drive And Optical Unit", also of L. M. Douglas. Also related is the commonly-assigned application Ser. No. 720,008, of James G. Baker for "Prism Camera" filed on even date herewith. The disclosure of each of these applications is incorporated herein.

The foregoing arrangement of the lens 12, image surface 18, and optical path 20 with the mirror reflector 24 and prism 26 attains a compact volume for the optical elements of the camera 10. Yet the camera provides a relatively large size photograph. By way of example, a camera constructed in the manner shown in FIGS. 2 and 3 and having a maximum height as measured vertically in FIG. 2 of under six centimeters, a maximum length as measured right to left in FIG. 2 of about sixteen centimeters, and a maximum width under ten centimeters as measured from top to bottom in FIG. 3, produces a finished picture measuring about eight by eight centimeters. In spite of this small size but large resultant photograph, the camera does not employ any folding or collapsible structure. It accordingly enjoys the operating simplicity and cost savings attendant with rigid body cameras.

The camera has the film-processing spread rollers located essentially outside a compact volume which the optical elements occupy, and adjacent an outer wall of the camera housing. This roller placement also provides a convenient exit for discharging a film unit as it emerges from between the spread rollers. Further, the spread rollers can readily be accessible for whatever maintenance they require, such as cleaning, due to their location adjacent the housing wall. The invention provides the foregoing features and advantages by allowing an exposed film unit to advance, prior to processing, along a relatively long path which traverses the optical image path within the camera.

Figure 4:
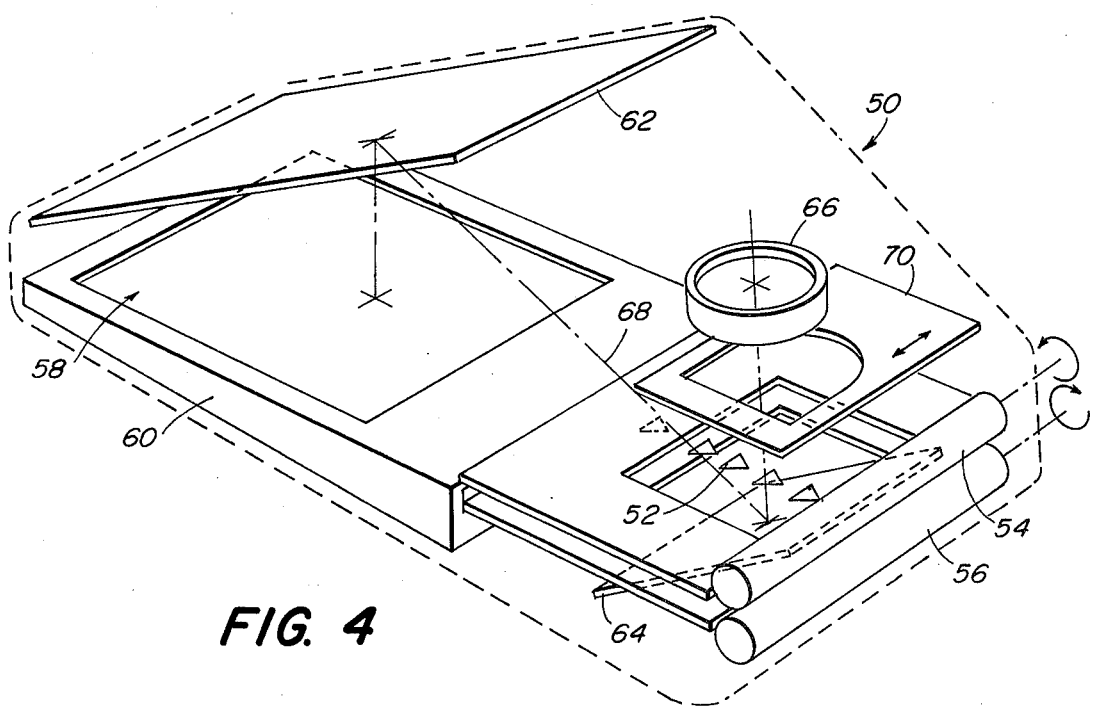
FIG. 4 is a simplified schematic view of another camera embodying features of the invention.

Features of the invention as described with reference to the camera 10 of FIGS. 1, 2 and 3 can be used in cameras having different configurations, as the camera 50 of FIG. 4 illustrates. This camera again has a film advance path 52 which traverses a folded optical image path. It also has processing-initiating spread rollers 54, 56 disposed remote from the image surface 58 for receiving an exposed film unit only after it traverses the optical image path. More particularly, the camera 50, which uses self-developing film units of the same type as the camera 10 of FIG. 1, houses a packaged set 60 of the film units for presenting the top one for exposure at the image surface 58. A mirror 62 and the taking lens 66 are located on one side of the plane of the image surface, and a second mirror 64 is located on the other side.

The lens 66, mirrors 64 and 62, and image surface 58 are in successive optical alignment along the folded image path 68. As designated with the principal ray of this path, light entering the taking lens along its axis impinges on the mirror 64, from which it is reflected to the mirror 62. From there, the light reflects to the image surface 58 for exposing the film unit located there.

It will be seen that the optical path in the camera 50 thus traverses the film advance path 52 twice, once in traversing from the lens to the mirror 64 and again in traversing from that mirror to the other mirror 62. The camera shutter 70 preferably is interposed between the lens and the film path to close these portions of the optical path except during exposure of a film unit at the image surface. The exposed film unit can accordingly be advanced along the film path 52 without danger of further unwanted exposure from light in the image path and be delivered to the press rollers 54, 56. After passing between the rollers, the film unit is discharged from the camera, suitably with engagement under an opaque screen and retaining device as described above with reference to element 42 of the camera 10, FIG. 2.

The foregoing arrangement of the camera 50 thus again provides a planar image surface, and provides both a film advance path and a press-roller nip which lie in this plane. While this planar construction is not required for the practice of features of the invention, and a curved advance path for example can be used, it is considered preferable. On the other hand, whereas the camera 10 of FIG. 1 has an odd number of reflections in the image path, the FIG. 4 camera 50 has an even number. The former accordingly presents to the image plane an image which is a reversal of the object, whereas in the latter camera the image focused on the image surface bears the same right-to-left orientation as the original image.

It will thus be seen that the objects set forth above, among those made apparent from the preceding description, are efficiently attained. Since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A camera of the self-developing type having a multiply-folded optical image path extending between a taking lens and an image surface at which a film unit is located for exposure, and in which each film unit advances separately from other film units, said camera having the improvement comprising
   A. means for guiding an exposed film unit from the image surface to a film-processing location along a film advance path which traverses therebetween said folded optical path, and
   B. processing means at said processing location for receiving an exposed film unit advanced along said film path and for processing it to initiate production of a visible image thereon.

2. A camera according to claim 1 having the further improvement in which said processing means includes means for spreading along a film unit photoprocessing composition packaged therewith.

3. A camera according to claim 1 having the further improvement in which said processing means includes spread roller means at said processing location.

4. A camera according to claim 1 in which said image surface is planar and having the further improvement wherein
   A. said processing means is located substantially in the plane of said image surface, and
   B. said guiding means advances the film unit along a path substantially coplanar with said image surface.

5. A camera according to claim 4 having the further improvement wherein said processing means includes spread roller means defining a nip which receives an exposed film unit and which lies substantially in the plane of said image surface.

6. In a camera of the self-developing type having a multiply-folded optical image path extending between a taking lens and a planar image surface at which a film unit is disposed for exposure, the improvement comprising
   A. optical path-folding means in optical alignment between the taking lens and the image surface and constituting at least part of said folded optical path, said path folding means including
      1. means forming a first optical surface facing the image surface from a first side thereof for directing image rays incident thereon from along said optical path to the image surface, and
      2. second means on the other side of the plane of said image surface for directing image rays along said optical path toward said first surface,
   B. means for guiding an exposed film unit from the image surface to a film-processing location along a film advance path which traverses therebetween said folded optical path, and
   C. means at said processing location for processing an exposed film unit to initiate production of a visible image thereon.

7. In a camera according to claim 6, the further improvement in which said second means comprises means forming an optically-reflective surface.

8. In a camera according to claim 6, the further improvement wherein the taking lens of said camera forms said second means.

9. In a camera according to claim 6, the further improvement in which said means forming said first surface comprises an optical prism, one face of which forms said first surface and a second face of which is disposed between said first surface and said image surface.

10. A self-developing camera which advances an exposed film unit to processing means without advancing other film units stored therein, said camera having a housing forming a chamber for receivingly holding a set of such film units and having a substantially planar image surface at which one film unit in the set thereof held in said chamber is disposed for exposure, said camera further comprising A. an optical prism having at least three optical faces in optical alignment along a folded optical path of the camera, said prism being disposed on a first side of the plane of said image surface with a first such surface facing obliquely toward said image surface and with a second surface located between said first surface and said image surface, said second prism surface overlying said image surface substantially parallel thereto and extending laterally along a first direction beyond said image surface and said chamber means,
  B. means for directing light along said optical path from the other side of said plane to said first side and into said prism at said third surface thereof for successfully reflecting from said second surface, reflecting from said first surface and refracting through said second surface, and
  C. means located laterally of said image surface and spaced along said first direction therefrom beyond said light directing means for receiving an exposed film unit advanced thereto along said first direction from said image surface and for spreading along the film unit processing composition packaged with the film unit.

11. A photographic camera comprising
  A. means for housing a substantially flat cassette of thin film units disposed in a stacked array extending depthwise of the cassette with a forwardmost of the film units located at the camera's focal plane,
  B. processing means for applying a compressive force to the forwardmost film unit after its exposure and as it is advanced therepast,
  C. means for guiding the forwardmost film unit after its exposure along a path extending between the cassette and said processing means, and
  D. means for exposing the forwardmost film unit within the cassette, said exposing means including an objective lens, a shutter and means for defining a folded optical path extending between said objective lens and the forwardmost film unit within the cassette, said optical path extending between said means for housing the cassette and said processing means and across said path defined by said guide means.

12. The camera of claim 11 wherein said objective lens and said shutter are located on the same side of said path defined by said guide means as the major portion of said means for housing the cassette.

13. The camera of claim 12 wherein said objective lens and said shutter occupy a space within said camera that extends a distance from said path defined by said guide means substantially no greater than the distance said means for housing the cassette extends from said focal plane.

14. The camera of claim 12 wherein said path defined by said guide means is substantially planar and the optical axis of said objective lens is canted with respect thereto.

15. The camera of claim 11 wherein said objective lens and said shutter are located on the opposite side of said path defined by said guide means from the major portion of said means for housing the cassette.

16. The camera of claim 12 wherein said path defined by said guide means is substantially planar and the optical axis of said objective lens is disposed substantially perpendicular with respect thereto.

17. A self-developing camera which advances an exposed film unit to processing means without advancing other film units therein, said camera having a chamber for receivingly holding a set of such film units, and a substantially planar image surface at which one film unit in the set thereof held in said chamber is disposed for exposure, and further comprising:
  A. a first optical surface facing said image surface and in optical alignment therewith for directing light rays incident on said first optical surface along a folded optical path onto said image surface,
  B. ray-directing means located laterally of said image surface along a first direction for directing light along a given optical path,
  C. a second optical surface reflective to light incident thereon mounted in optical alignment along said given path for receiving light from said ray-directing means and redirecting it toward said first optical surface,
  D. processing elements for receiving an exposed film unit and initiating processing thereof for production of a visible image thereon, said processing elements being disposed laterally of said image surface along said first direction beyond said ray-directing means, and
  E. means for guiding an exposed film unit from said image surface to said processing elements along a film advance path which traverses said given optical path in the span thereof between said ray-directing means and said second optical surface.

* * * * *